United States Patent [19]

Gildea et al.

[11] 4,270,679
[45] Jun. 2, 1981

[54] CAMERA MOUNT

[76] Inventors: Dennis M. Gildea, 45 Division St., North Quincy, Mass. 02169; Peter Nota, 15 Spence Ave., Quincy, Mass. 02169

[21] Appl. No.: 935,857

[22] Filed: Aug. 22, 1978

[51] Int. Cl.³ .............................................. A45C 1/04
[52] U.S. Cl. ................................... 224/181; 224/908; 2/422; 354/81
[58] Field of Search .............. 224/5 V, 5 R, 5 A, 5 B, 224/5 H, 181, 908, 271; 2/422, 185R, 199; 354/81, 82; 352/242; 248/362, 363

[56] References Cited

U.S. PATENT DOCUMENTS

| | | | |
|---|---|---|---|
| 2,369,829 | 2/1945 | Johnson | 224/5 V |
| 2,711,122 | 6/1955 | Klumpp | 354/82 |
| 2,711,765 | 6/1955 | Pecoraro | 248/362 |
| 2,809,008 | 10/1957 | Halvarson | 248/362 |
| 3,435,460 | 4/1969 | Grant | 2/422 |
| 3,722,764 | 3/1973 | Kollander | 224/181 |
| 3,767,095 | 10/1973 | Jones | 224/5 V |

Primary Examiner—Robert J. Spar
Assistant Examiner—Kenneth Noland

[57] ABSTRACT

A camera mount for use with human headgear, the mount removeably engaged to the headgear by attachment devices such as suction cups or an adherent pad and through adjustable connections devices such as buckles, straps and clips. The mount includes a base plate on which the camera is positioned.

2 Claims, 5 Drawing Figures

CAMERA MOUNT

BACKGROUND OF THE INVENTION

Many sportsmen would like to take pictures of their sport from the point of view of the individual practicing the sport. For instance, a skier would take moving pictures as he skied down a trail or a motorcyclist would take moving pictures as he drove along a trail or road.

The sportsman whose activities leaves his hands free, the skier, for example, could use a shoulder camera mount to take such pictures. However, the skier would have more control if his hands were free to use ski poles, and obviously where the sport requires the use of one or both hands such as motorcycling or snowmobiling, a shoulder mount would not be satisfactory.

The prior art discloses several camera mounts which have straps encircling the head and which position the camera in front of the face of the wearer. See U.S. Pat. Nos. 1,691,733; 1,907,437 and 1,929,052. See also the U.S. Pat. to Johnson, U.S. Pat. No. 2,369,829, which utilizes a head band to which a frame is attached on which the camera is mounted. This type of mount would, in all probability, not operate where a helmet is worn by the user.

SUMMARY OF THE INVENTION

This invention is directed at a camera mount to be used with human headgear. The mount includes a base plate, engagement means, affixation means, attachment means and connection means, all of which are associated with the base plate.

The base plate may be of rectilinear configuration whose corners are bent at an angle to the plane of the base plate and each of the angles includes a slot comprising the engagement means. The affixation means can be a headed, threaded member passed through an aperture in the base plate or a threaded member welded or soldered to the base plate.

Each of the connection means may comprise a strap having a buckle and a clip both associated with the strap. The attachment means could be suction cups or a tacky, elastomeric pad fastened to the base plate and adapted to removeably engage the headgear.

BRIEF DESCRIPTION OF THE DRAWINGS

Further details as explained below with the help of the example illustrated in the attached drawings in which.

DESCRIPTION OF THE PREFERRED EMBODIMENTS

Figure 1:
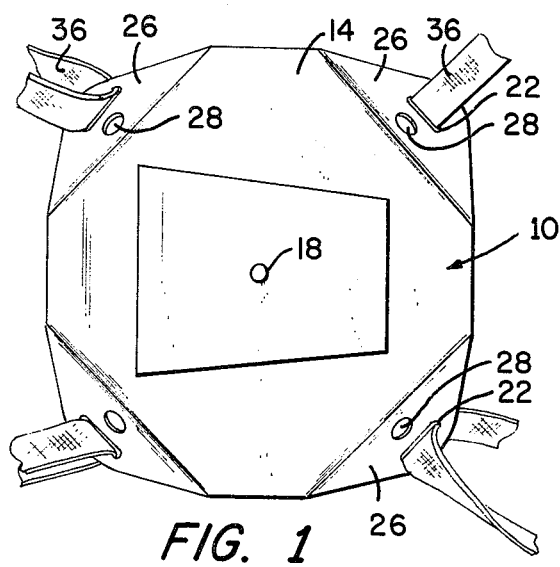
FIG. 1 is a top plan view of the base plate, the affixation means and the connection means, broken off, of the camera mount of the invention.

There is shown in the drawings a mount 10 for a camera 12. Generally speaking, the mount 10 includes a rectalinear base plate 14 having a central aperture 16 formed therethrough, affixation means 18, attachment means 20, engagement means 22 and connection means 24.

Figure 2:
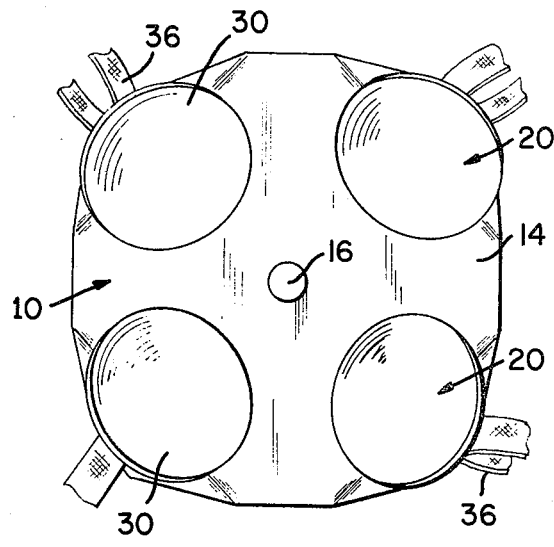
FIG. 2 is a bottom plan view of the base plate, affixation means, attachment means and connection means, broken off, of the camera mount of the invention.
Figure 3:
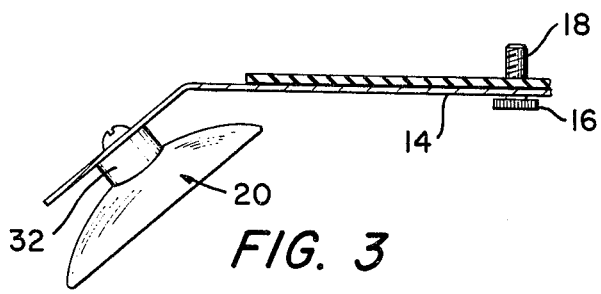
FIG. 3 is a side elevation of the base plate, broken off, the affixation means and the attachment means of the camera mount of the invention.
Figure 4:
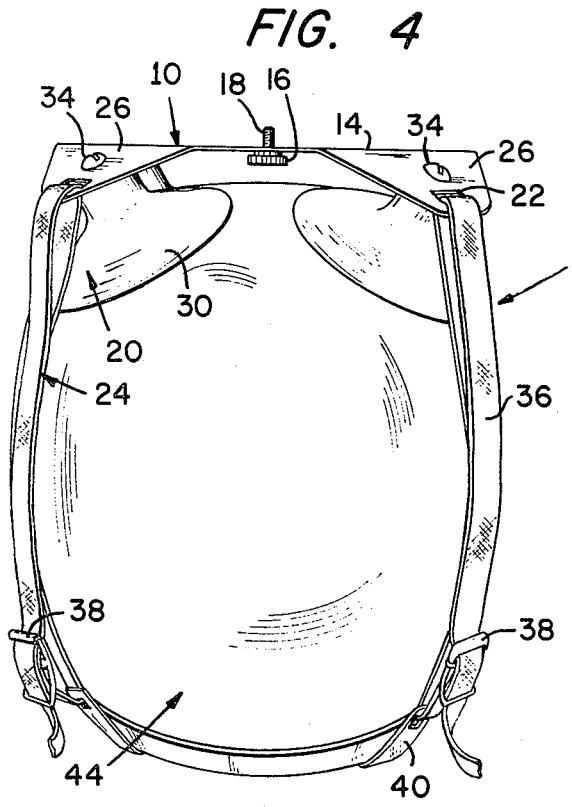
FIG. 4 is a rear elevation of a helmet with the camera mount, of the invention, engaged thereto.
Figure 5:
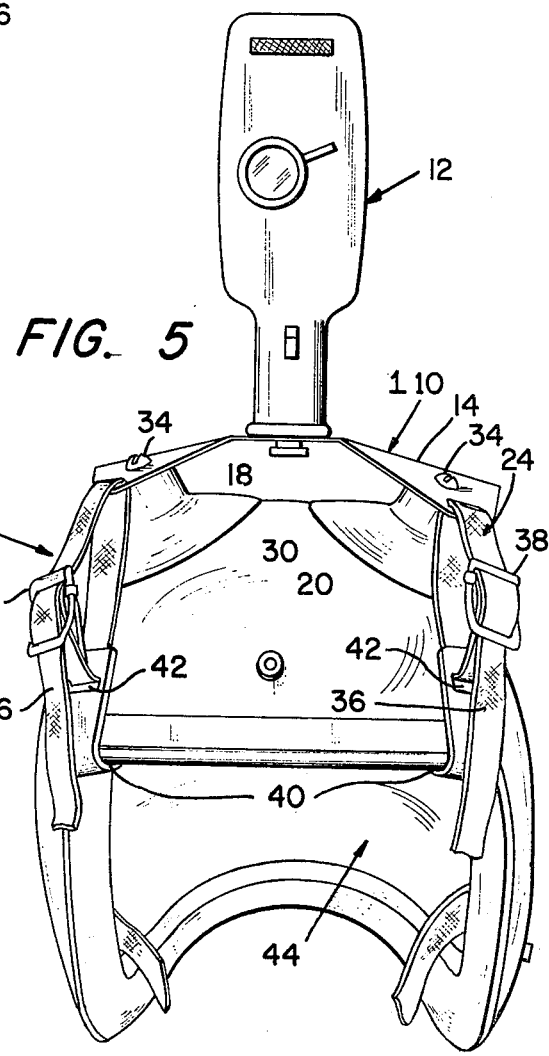
FIG. 5 is a front elevation of the helmet and camera mount shown in FIG. 4 having a moving picture camera engaged thereto.

More specifically and referring to FIGS. 1–3 of the drawings, the affixation means 18 comprises a headed bolt which has universal camera threads and which is threaded in and through the central aperture 16 positioning the greater portion of the threads above the upper surface of the base plate 14 and the head of the bolt into abutting relation with the lower surface of the base plate 14 adjacent the central aperture 16. The base plate 14, prior to bending the corners, is substantially square in configuration.

The corners of the base plate 14 are bent downwardly at an angle of approximately 30 degrees to its horizontal plane and the apexes of the corners are removed to provide truncated configurations. Prior to bending, the sides of the base plate 14 are 7" long and after bending, the height of each bent corner 26 from its truncated end to the line of the bend is approximately 1.5 inches. A through hole 28 is formed on the midline of each corner 26 and has its center about ⅜" from the bend line. The engagement means 22 is positioned in each corner between the hole 28 and the free terminal edge and comprises a generally elliptical, through slot.

The attachment means 20 comprises a suction cup 30 attached to and facing away from each of the corners 26. A cylindrical shank portion 32 extends from the central part of the rear surface of the suction cup 30, and has its surface, that will abut the surface of the corner 26, provided with a tapped hole that extends co-axially and is adapted to accept a headed screw 34. The engagement of the attachment means 20 with the corner 26 is accomplished by passing the threaded part of the headed screw 34 through the hole 28 and threading it into the tapped hole in the shank portion 32 drawing the suction cup 30 into abutting relation with the corner 26.

If desired, the suction cups could be mounted on swivels to assure proper engagement between the suction cups and the head gear.

Each of the connection means 24 comprises a strap 36 having a buckle 38 affixed at one terminal end and a rectangular, hook shaped clip 40 including a transverse substantially rectangular slot 42 through which the strap 36 is passed. After the free terminal end of the strap 36 is engaged to the clip 40, through a transverse slot 42 formed in the clip 40 it is threaded through the engagement means 22 and adjustably attached to the buckle 38.

If desired, the affixation means 18 could comprise a cylindrical, externally threaded member, one terminal end of which is welded to the central upper surface of the base plate 14 at the position of the now absent central aperture 16.

An alternative design for the attachment means 20, to the use of suction cups explained hereinbefore, is a pad of rectangular or circular elastomeric material which is attached by glue or other adherent means to the central, lower surface of the base plate 14. The elastomeric material would be tacky enough, and there are several such materials available, to provide a firm engagement between the base plate 14 and headgear. In this case, there would be no need for the holes 28 in the corners 26.

In order to utilize the mount 10 with the headgear 44, such as a motorcycle safety helmet, the attached suction cups 30 are pressed into engagement with the upper surface of the headgear 44. The forward straps 36 are adjusted so that U portions of the clips 40, attached to the forward straps 36, can be hooked under the front rim of the headgear 44 and the straps are tensioned through the buckles 38 of the forward straps 36. The same procedure is followed for the rear straps 36 and clips 40, with the clips 40 engaged to the rear rim of the head gear 44. The camera 12 is now screwed onto the affixation means 18. The assembly of mount 10 and camera 12 is placed on the head of the photographer and with the help of an assistant, the camera 12 is placed in the final position desired by adjusting the placement of the mount 10 on the headgear 44, by moving the mount 10 and readjusting the length of the straps 36.

In a final position, the lens of the camera 12 will usually be facing approximately toward the same direction as the wearer of the mount 10. The wearer can then trigger the camera 12, a motion picture camera, for example, and take a series of pictures.

The mount 10 can be disengaged from the headgear 44 by loosening the straps 36, freeing the clips 40 and then stripping the suction cups 30 from the headgear 44.

What we claim is:

1. A mount for a camera, the mount comprising:
    (a) a flat, rectilinear base plate having first and second engagement means, upper and lower surfaces, a plane, a first angle portion and a second angle portion, the first and second angle portions being bent at an angle to the plane of the base plate, and spaced from each other, the first angle portion having the first engagement means associated therewith and the second angle portion having the second engagement means associated therewith, the lower surface having attachment means associated therewith, the attachment means comprising suction cups, each suction cup adapted to engage the exterior surface of protective headgear having a cup portion and a stem portion and a suction cup attached to the first angle portion and another suction cup attached to the second angle portion,
    (b) affixation means associated with the base plate having means for engaging a camera and extending above the plane of the base plate, and
    (c) adjustable connection means associated with the first and second engagement means whereby the affixation means is adapted to engage a camera and the connection means is adapted to engage the edge of the protective headgear near the open end thereby fixing the camera in spaced relation to the headgear when the headgear is worn by a human.

2. A mount as set forth in claim 1, the connection means including an adjustable strap having a clip associated therewith, the clip adapted to engage a helmet or the like.

* * * * *